United States Patent [19]

Meek et al.

[11] Patent Number: 4,695,695

[45] Date of Patent: Sep. 22, 1987

[54] MIXTURE FOR PRODUCING FRACTURE-RESISTANT, FIBER-REINFORCED CERAMIC MATERIAL BY MICROWAVE HEATING

[75] Inventors: Thomas T. Meek, Los Alamos; Rodger D. Blake, Santa Fe, both of N. Mex.

[73] Assignee: The United States of America as represented by the United States Department of Energy, Washington, D.C.

[21] Appl. No.: 719,654

[22] Filed: Apr. 3, 1985

[51] Int. Cl.[4] .......................... H05B 6/64; C04B 35/36
[52] U.S. Cl. ...................... 219/10.55 M; 219/10.55 R; 501/95; 501/97; 264/25; 264/65
[58] Field of Search ................ 219/10.55 M, 10.55 R, 219/10.55 F; 501/97, 95, 96, 89, 88, 32, 11; 264/25, 26, 65, 63, 64

[56] References Cited

U.S. PATENT DOCUMENTS

| | | | |
|---|---|---|---|
| 3,585,258 | 6/1971 | Levinson | 219/10.55 |
| 3,732,048 | 5/1973 | Guerga et al. | 264/25 |
| 3,756,839 | 9/1973 | Rao . | |
| 3,953,703 | 4/1976 | Hurwitt | 219/10.55 M |
| 4,003,368 | 1/1977 | Maxel | 219/10.55 |
| 4,147,911 | 4/1979 | Nishitani | 219/10.55 M |
| 4,179,596 | 12/1979 | Bjork | 219/10.55 M |
| 4,205,033 | 5/1980 | Hattori et al. | 501/97 X |
| 4,219,361 | 8/1980 | Sutton et al. | 219/10.55 M |
| 4,273,950 | 6/1981 | Chitre | 219/10.55 M |
| 4,307,277 | 12/1981 | Maeda et al. | 219/10.55 R |
| 4,354,991 | 10/1982 | Suzuki et al. | 501/89 X |
| 4,485,179 | 11/1984 | Brennan et al. | 501/89 X |
| 4,490,319 | 12/1984 | Lee et al. | 264/65 |
| 4,529,857 | 7/1985 | Meek et al. | 219/10.55 M |
| 4,541,729 | 9/1985 | Schubring | 374/31 |
| 4,543,345 | 9/1985 | Wei | 501/95 |
| 4,603,116 | 7/1986 | Smith et al. | 501/97 |

OTHER PUBLICATIONS

U.S. patent application Ser. No. 668,054 filed Nov. 5, 1984, by Thomas T. Meek, Rodger D. Blake, and Haskell Sheinberg entitled "Fabrication of Low Density Ceramic Material."

L. W. Tobin, Jr., "Microwave and Ceramics: A Process Breakthrough," in *Advances in Ceramics: Processing for Improved Productivity*, K. M. Nair, Ed., proceedings of a special conference held during the 85th Annual Meeting of the American Ceramic Society, Chicago, Ill., Apr. 24–27, 1983 (The American Ceramic Society, Inc., Columbus, Ohio, 1984), vol. 11, pp. 157–169.

William A. Smith, "Microwaves and Material Science in Foundry Applications," Am. Chem. Soc., Org. Coat. Plast. Chem. 39, 324–328, (1978).

Gerald S. Cole, "Sodium Silicate Bonded Sand Bodies Cured with Microwave Energy," Am. Chem. Soc., Org. Coat. Plast. Chem. 39, 330–335 (1978).

R. G. Cummisford, "Curing Spirit with Microwave," Am. Chem. Soc., Org. Coat. Plast. Chem. 39, 329 (1978).

T. T. Meek and D. M. Mattox, "Advanced Substrates for High Speed Digital Switching," Int. Microelectronics Conference, Anaheim, Calif., Tech. Program Proc., Feb. 24–26, 1981, (©Cahners Exhibition Group, Chicago, Ill., 1981), pp. 113–124.

*Primary Examiner*—Philip H. Leung
*Attorney, Agent, or Firm*—Joseph M. Hageman; Ray G. Wilson; Judson R. Hightower

[57] ABSTRACT

A fracture-resistant, fiber-reinforced ceramic substrate is produced by a method which involves preparing a ceramic precursor mixture comprising glass material, a coupling agent, and resilient fibers, and then exposing the mixture to microwave energy. The microwave field orients the fibers in the resulting ceramic material in a desired pattern wherein heat later generated in or on the substrate can be dissipated in a desired geometric pattern parallel to the fiber pattern. Additionally, the shunt capacitance of the fracture-resistant, fiber-reinforced ceramic substrate is lower which provides for a quicker transit time for electronic pulses in any conducting pathway etched into the ceramic substrate.

14 Claims, 2 Drawing Figures

MIXTURE FOR PRODUCING FRACTURE-RESISTANT, FIBER-REINFORCED CERAMIC MATERIAL BY MICROWAVE HEATING

This invention is the result of a contract with the Department of Energy (Contract No. W-7405-ENG-36).

BACKGROUND OF THE INVENTION

The present invention relates generally to a fiber containing mixture and method for producing a fracture-resistant, fiber-reinforced ceramic material by the use of microwave heating.

Conventional manufacture of ceramics has been done by the use of resistant heating furnaces, which consume relatively large quantities of energy, time, and manpower while subjecting the ceramics to rather hostile environments. An alternative method of producing ceramic material used in seals was disclosed in U.S. Pat. No. 4,529,856 and U.S. Pat. No. 4,528,857 for "Ceramic-Glass-Metal Seal By Microwave Heating" and "Ceramic-Glass-Ceramic Seal By Microwave Heating" respectively. The ceramic materials used in the seals were formed by subjecting a slurry comprising a coupling agent, such as watch oil, and a sealing material, such as glass, evenly spread between the ceramic and ceramic or metal substrates, to microwave energy in order to cause heating and formation of the seal. An additional method and mixture for making ceramic materials, also used in seals, was disclosed in U.S. Pat. No. 4,606,748. This other method consisted of subjecting a mixture of glass sealing material, a coupling agent, and an oxidizer to microwave radiation which heated the mixture, sufficiently to ignite the oxidizer and to cause a liquid-phase seal to form.

Problems still remained with the ceramic materials formed even by these new microwave heating processes. Specifically, when ceramic materials were produced in shapes larger than about 4"×4" (10 cm×10 cm), fractures would result. Additionally, the ceramic materials produced both by the microwave heating process and by conventional processes, could not be modified in such a way that the heat built up either in or on the ceramic substrate could be dissipated in a geometrically controlled manner. Finally, the ceramic materials had no special shunt capacitance values that would allow quicker transit times for electronic pulses in any conducting pathways established on the ceramic substrates.

Therefore, it is an object of the present invention to provide an improved method of forming ceramic substrates which have greater fracture resistance in larger geometric shapes.

It is the further object of the present invention to provide an easily automated, low energy, efficient, fast, and effective method for forming ceramic substrates with increased strength.

It is yet another object of the present invention to provide a ceramic substrate in which the dissipation of heat produced in or on the substrate can be geometrically controlled.

Finally, it is another object of the present invention to provide a ceramic substrate with a shunt capacitance value such that electronic pulses in established conducting pathways have quicker transit times.

SUMMARY OF THE INVENTION

To achieve the foregoing and other objects, and in accordance with the purposes of the present invention, as embodied and broadly described herein, the method of this invention may comprise preparing a ceramic prescursor mixture comprising glass material, a coupling agent, and resilient fibers; enclosing the mixture within an insulative material; microwaving said mixture at a power, time, and frequency sufficient to bond ceramic material to the fibers; and allowing the material to cool thereby securing a fracture-resistant, fiber-reinforced ceramic material.

The present invention may also comprise, in accordance with its objects and purposes, a fracture-resistant, fiber-reinforced material produced by a method comprising the steps of preparing a ceramic precursor mixture comprising glass material, a coupling agent, and resilient fibers; enclosing the mixture within an insulative material; microwaving the mixture at a power, time, and frequency sufficient to bond ceramic material to the fibers; and allowing the material to cool, thereby securing a fracture-resistant, fiber-reinforced ceramic material.

Additionally, the present invention may also comprise, in accordance with its objects and purposes, the fracture-resistant, fiber-reinforced ceramic substrate wherein the fibers are oriented in such a manner that the heat generated in or on the substrate is dissipated in a desired geometric pattern parallel to the fiber pattern.

Finally, the present invention may also compromise, in accordance with its objects and purposes, the fracture-resistant, fibver reinforced ceramic substrate whose shunt capacitance value for a conducting pathway is lower than the same ceramic material without fibers.

An advantage of the present invention is derived from the significant time and energy savings compared to conventional, i.e., radiant, heating methods for manufacturing eramic subdstrates.

Still another advantage of the present invention is the greater strength present in any cerammic material manufactured with resilient fibers included.

Still another advantage of the present invention is the ability to bring about a desired heat dissipation pattern in accordance with the orientation of thee fibers within the ceeramic substrate.

Yet another advantage of the presernt invention is the lower shunt capacitance value for a conducting pathway in or on the fiber-reinforced ceramic substrate, which leads to a quicker electronic pulse travel time for any circuit in or on the ceramic substrate.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 2:
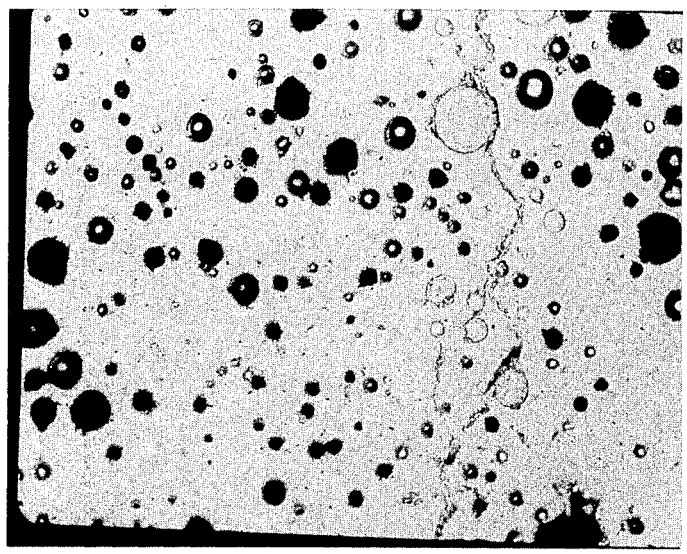
FIG. 2 is a photomicrograph at 500 times magnification of a polished section of the fracture-resistant, fiber-reinfoeced ceramic material produced in Example II.

The first step in forming a fracture-resistant, fiber-reinforced ceramic material by use of microwave heating is to prepare a mixture containing the coupling agent, galss material, and reesilient fibers. The glass sealing material is most often a glass with therman expansion properties which are compatible with the resilient fibers to be bonded. Coupling agents can be such materials as oils, specifically watch oil, glycerol, silicon carbide, water, and sugar. The preceding coupling agents all couple, i.e., absorbe microwaves and convert the energy into thermal energy, to microwaves of 2.45 gHz/ frequency.

Other molecular bonds alos couple to microwaves of 2.45 gHz/ frequency. These bonds include those present in $NO_2$, $NO_3$, $CO_2$, and $NH_3$ groups. When an oxodizer includes one of these groups, the oxidizer can provide heat by convection to raise the temperature of the galss material as well as raise its own temeperature toward the ignition point. Optional oxidizers that can be included in the ceramic precursor mixture include nitrates, which are the preferred oxidizers, with sodium nitrate being the most preferred oxidizer.

As the temperature of the galss material is raised, the material ceased to be transparent to microwaves and it starts to generate heat as a result of coupling to the microwaves. If the ceramic precursor mixture also contains an oxidizer, the oxidizer is ignited by the convection of heat from the coupling agent. When the oxidizer is ignited, the extra heat thus provided insures a thorough melting of the ceramic precursor mixture and a strong bond to the resilient fibers. Due to the extra heat generated by the ignition of the sodium nitate, the mixture temperatures cna go as high as 1000° C. At this temperature, the high temperature glass material couples sufficiently to the microwaver energy to continue heating. Mixing of the ingredients for the ceramic precursor mixture is done by conventinal techniques.

After throrough mixing of the components of the ceramic precursor mixture, the mixture was placed in a zirconia crucible. In a production setting, a ceramic precursor mixture could be transformed into a ceramic substrate by the well-known method of tape casting. The tape casting method usually uses a conventional heat source such as radiant heat. For this invention, the heating region would be a microwave tunnel whre the tape would move continually thorugh the region of exposure to micxrowave radiation.

For the batch method involving curcibles, the procedure for microwave heating is described in general terms in U.S. Pat. No. 4,529,857, which is specifically incorproated herein by reference. Briefly, in that patent application, after the ceramic workpieces are ready for heating in order to be sealed, as contrasted with the formation of the ceramic substrate in this instance, they are surrounded with an insulative material, placed in a cavity, usually called an oven, for exposure to microwave energy, and then heated by the microwave energy sufficiently long to raise the galss to a high enough temperature so that a glass seal is formed. In this application, the exposure to microwave energy would be sufficiently long to thoroughly melt the ceramic precursor mixture in order to insure an adequate bond between the ceramic material and the resilient fibers. However, the exposure time to microwave energy should not be so long as to lead to the degradation of the resilient fibers. When using conventional heat sources, the exposure time to the high heat can be so long as to bring about substantial degradation of substantial numbers of fibers in order to insure adequate bonding with the remaining fibers. Thus the microwave heating method allows a quick heating such that the glass material is bonded to the resilient fibers before the fibers are degraded. After allowing sufficient time for the bond between the resilient fibers and the glass material to form, the crucibles are removed from the microwave oven and allowed to cool.

An additional feature obtained when using exposure to microwave radiation as a means of heating, is that the ExH vector of the electromagnetic field established in the reaction cavity orients the fibers in a single direction. This orientation allows the fibers to act as a means for directing heat generated in or on the substrate (the substrate in use, not during the formation of the substrate) in a desired geometric pattern parallel to the fiber pattern. This is due to the fact that generally heat will flow in a pattern parallel to the fiber pattern.

Another advantage of the fiber-reinforced ceramic substrate is that when the base of the substrate is used as an electrical ground plane the shunt capacitance of the substrate is changed. Careful selection of the resilient fibers to have a lower dielectric constant than the ceramic substrate means that the fracture-resistant, fiber-reinforced ceramic substrate will have a lower dielectric value than the same ceramic material without fibers. As a result of this lower dielectric constant, the shunt capacitance of the ceramic material around an established conducting pathway will be lower. This lower shunt capacitance will mean that any electronic pulse traveling along the conducting pathway will experience a quicker transit time because the lower shunt capacitance will distort the pulse less.

EXAMPLE I

A ceramic precursor mixture was prepared with the following ingredients:
SiC fibers—1.0 grams
$Al_2O_3$—8 grams
$NaNO_3$—6.5 grams
Glycerol—10 grams.

It should be noted that the above $Al_2O_3$ sinters at 1850° C. by use of conventional heating means, and with the addition of the oxidizer $NaNO_3$ the expected reaction temperature is 1000° C. This temperature is reached for a short time and then the $Al_2O_3$ couples and heats to its sintering temperature. After mixing, the ceramic precursor mixture is placed in a $ZrO_2$ crucible which measures 2.5 cm in diameter by 2 cm in height.

The crucible was then placed in a Zircar AL-15 insulative cavity and then this was placed in the area of the highest microwave electric field intensity in a Litton Model 1521 microwave oven.

The oven was turned on to full power and allowed to run 60 minutes. The ceramic material bonds well to the SiC fibers.

EXAMPLE II

The following mixture was made and put into a $ZrO_2$ crucible, then placed in a thermally insulative cavity and finally exposed to microwaves in a Litton 1521 microwave oven as in Example I:
SiC fibers—1.3 grams
Pyrex (7740)—12 grams
$NaNO_3$—4 grams Glycerol—7 grams.

The oven was run at full power for 64 minutes and a fiber-reinforced ceramic substrate was formed. The Pyrex (7740) glass is a trademarked product of Corning Glass.

Figure 1:
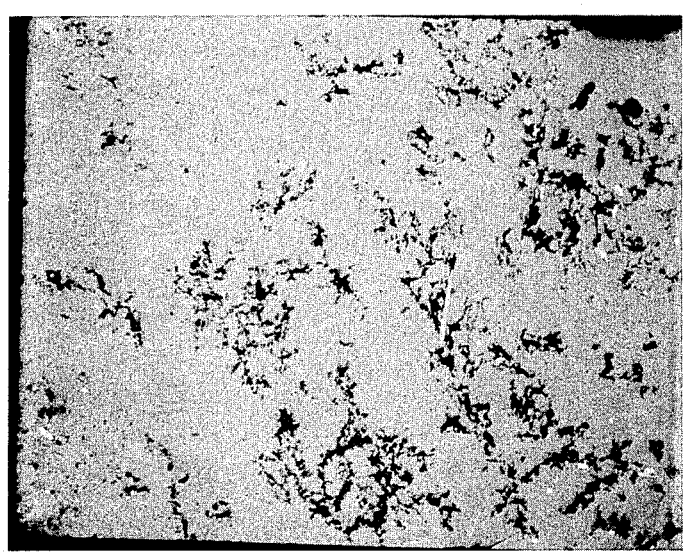
FIG. 1 is a photomicrograph of at 100 times magnification of a polished section of the fracture-resistant, fiber-reinforced ceramic material produced in Example II.

FIG. 1 is a cross-sectional view at 100 times magnification of the ceramic product formed. A SiC fiber can be seen oriented in a horizontal direction. FIG. 2 can be thought of as an end view at 500 times magnification. The presence of the circles attests to the parallel orientation of the fibers.

EXAMPLE III

The following mixture was made into a fracture-resistant, fiber-reinforced ceramic material as in Example II:
$Si_3N_4$ fibers—1.5 grams
$Al_2O_3$—10.5 grams
Glycerol—9 grams.

The microwave oven, however, was run for 110 minutes at full power.

EXAMPLE IV

The following ceramic precursor mixture was made into a fracture-resistant, fiber-reinforced ceramic material by heating at full power for 65 minutes as in Example II. Whiskers were present in the melted glass:
$Si_3N_4$ fibers—1.5 grams
Pyrex (7740)—10 grams
Glycerol—10 grams.

EXAMPLE V

The following mixture was made into a fracture-resistant, fiber-reinforced ceramic material by heating it for 90 minutes as in Example II:
$Si_3N_4$ fibers—1.2 grams
$ZrO_2$—15 grams
$NaNO_3$—8 grams
Glycerol—12 grams.

EXAMPLE VI

The following ceramic precursor mixture was made into a fracture-resistant, fiber-reinforced ceramic material by heating it for 130 minutes as in Example II:
SiC fibers—1.6 grams
$ZrO_2$—15 grams
$Zr(NO_3)_4$—10 grams
Glycerol—12 grams.

EXAMPLE VII

The following mixture was made into a fracture-resistant, fiber-reinforced ceramic material by heating it for 105 minutes as in Example II:
$Si_3N_4$ fibers—1.2 grams
custom glass (850° melting point)—10 grams
Glycerol—8 grams.

The custom glass was produced for use in this Example from a mixture of the following percentages: PbO-50%, $Al_2O_3$-5%, $SiO_2$-35%, $B_2O_3$-10%.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain dsthe principles of the invention and its practical application to thereby enable others skilled in the art to best utilize the invention in various embodiments and with various modifications as are suited to the particular use comteplated. It is intended that dthe scope of the invention be defined by the claims appended hereto.

What we claim is:

1. A method for producing a fracture-resistant, fiber-reinforced ceramic material comprising the steps of:
    a. preparing a ceramic precursor mixture comprisinng glass material, a coupling agent, and resilient fibers;
    b. enclosing said mixture with an insulative material;
    c. microwaving said mixture at a power, time, and frequency sufficient to bond ceramic material to said fibers; and
    d. allowing said material to cool, thereby securing a fracture-resistant, fiber-reinforced ceramic material.

2. The method of claim 1, wherein said ceramic precursor mixture additionally contains an oxidizer which ignites during the microwaving step c, thereby causing a liquid-phase material to form before the cooling step d.

3. The method of claim 2, wherein said oxidizer is a nitrate.

4. The method of claim 2, wherein said fibers are silicon carbide or silicon nitride.

5. The method of claim 1, wherein said coupling agent is glycerol.

6. The method of claim 1, wherein said fibers are silicon carbide or silicon nitride.

7. The method of claim 1, wherein said microwaving is continued at a sufficient power, time, and frequency to orient said fibers substantially all in the same direction.

8. The fracture-resistant, fiber-reinforced material produced by a method comprising the steps of:
    a. preparing a ceramic precursor mixture comprising glass material, a coupling agent, and resilient fibers;
    b. enclosing said mixture with an insulative material;
    c. microwaving said mixture at a power, time, and frequency sufficient to bond ceramic material to said fiber; and
    d. allowing said material to cool, thereby securing a fracture-resistant, fiber-reinforced ceramic material.

9. The material of claim 8, wherein said ceramic precursor mixture additionally contains an oxidizer which ignites during the microwaving step c, thereby causing a liquid-phase material to form before the cooling step d.

10. The material of claim 9, wherein said oxidizer is a nitrate.

11. The material of claim 9, wherein said fibers are silicon carbide or silicon nitride.

12. The material of claim 8, wherein said coupling agent is glycerol.

13. The material of claim 8, wherein said fibers are silicon carbide or silicon nitride.

14. The material of claim 8, wherein said microwaving is continued at a sufficient power, time, and frequency to orient said fibers substantially all in the same direction.

* * * * *